United States Patent [19]

Brown et al.

[11] Patent Number: 4,537,332

[45] Date of Patent: Aug. 27, 1985

[54] BEVERAGE DISPENSER WITH IMPROVED IN-BOWL WHIPPER

[75] Inventors: Merle S. Brown, Cohasset; William A. Arzberger, Medfield, both of Mass.

[73] Assignee: Jet Spray Corp., Norwood, Mass.

[21] Appl. No.: 430,234

[22] Filed: Sep. 30, 1982

[51] Int. Cl.³ .............................................. B67D 1/10
[52] U.S. Cl. .................................. 222/190; 222/333; 222/376; 222/377; 62/392; 261/93
[58] Field of Search ............... 222/190, 377, 333, 372, 222/376; 261/93; 62/392; 366/306

[56] References Cited

U.S. PATENT DOCUMENTS 3,119,531  1/1964  Jacobs ............................ 222/377 X
3,920,163  11/1975  Brown ................................. 222/190

Primary Examiner—Joseph J. Rolla
Assistant Examiner—Frederick R. Handren
Attorney, Agent, or Firm—Wolf, Greenfield & Sacks

[57] ABSTRACT

A non-carbonated beverage dispenser having an in-bowl whipper assembly which includes a housing disposed in the bowl and immersed in the beverage, a magnetically driven impeller in the housing, and a discharge passage from the housing connected to the spigot of the dispenser to discharge the whipped beverage from the bowl. The whipper is rotated at 4000 rpm or above, and the height of the impeller blades is made very small (in the order of 1/32 to 1/16 inch) to produce very fine and uniform bubbles in the beverage without uncoupling the magnetic drive.

5 Claims, 5 Drawing Figures

BEVERAGE DISPENSER WITH IMPROVED IN-BOWL WHIPPER

INTRODUCTION

This invention relates to non-carbonated beverage dispensers having in-bowl whippers for frothing the beverage immediately before it is discharged. The invention has particular application in refrigerated beverage dispensers. The invention is an improvement over the in-bowl whipper shown in prior U.S. Pat. No. 3,920,163 dated Nov. 18, 1975 and assigned to the assignee of this application.

Prior U.S. Pat. No. 3,920,163 describes in detail the advantages of an in-bowl whipper over the conventional whippers widely used, which are disposed outside the bowl in association with the discharge spigot of the dispensers. These advantages are very important, and the invention of the prior U.S. Pat. No. 3,920,163 has met with very considerable commercial success.

The disadvantages of the exterior whippers bear repeating. First, because the whippers are mounted exterior of the bowl and consequently are not refrigerated, any beverage which is left in the whipper may become warm and if left there long enough, may spoil because of a build up of bacteria. Second, with external whipper assemblies the on-off valve is disposed between it and the bowl, and consequently the operator must shut the valve before the cup is filled and approximate the volume of beverage in the whipper housing, and frequently the cup either overflows or is not filled. Third, the external whipper assemblies which normally are attached to the bottom of the discharge spigot necessitate lowering the drip tray to accommodate this extra attachment on the front of the machine. Fourth, even though the whipper assemblies in the prior art are mounted externally of the bowl, they are not ordinarily readily disassembled, and consequently they are difficult to clean. Fifth, the whipper assemblies of the prior art ordinarily have a shaft which projects from the dispenser base into the whipper housing, and the shaft seals are prone to wear and cause leakage.

All of the disadvantages of the exterior whippers described above are eliminated by the in-bowl whippers. Because the whipper assembly is disposed within the refrigerated bowl, the beverage which remains in the whipper assembly does not become warm and/or spoil. This is particularly important for dairy based drinks. The on-off valve is located downstream of the whipper, and therefore the operator need not approximate the contents of the whipper assembly in determining when the valve should be closed. Furthermore, the whipper of the present invention may merely be dropped into the bowl, and it can be removed conveniently for cleaning. Furthermore, there are no shafts which extend into the whipper housing that necessitate seals which may wear and leak.

In the earlier U.S. patent, supra, and in accordance with the present invention, the whipper assembly includes a housing which is disposed inside the beverage bowl, and the housing in turn includes an inlet which is in constant communication with the bowl and a discharge passage which is connected to the spigot of the dispenser. An impeller in the housing is magnetically driven by a motor and drive magnet located outside the bowl within the dispenser base. The blades on the impeller cooperate with fins in the housing to cause a whipping action of the beverage. An air inlet tube is connected to the housing and its upper end is located above the beverage in the bowl. Air is entrained into the housing through the tube to further froth the beverage.

Applicants have discovered that the quality of whipping can be appreciably improved by rotating the impeller at greater speeds than was the practice heretofore and by reducing the height of the impeller blades. In the commercial embodiment of the whipper of the earlier patent, a shaded pole fractional horsepower motor was employed which rotated at approximately 3,200 rpm, and the blades of the impeller were approximately 3/16 inch in height. Applicants have now discovered that a much finer and more uniform bubble size can be achieved by rotating that whipper at 4,000 rpm or more, and substantially reducing the height of the whipper blades to 1/16 inch or less. Moreover, the consistency of the beverage may also be improved by reducing the inlet to the whipper housing to one or more ports whose location is selected with the particular beverage to be dispensed in mind. This combination produces markedly improved whipping without interfering with the coupling between the drive and driven magnets.

It is very important that the magnetic coupling between the drive magnet and the driven magnet within the impeller be preserved. The higher rotational speed of the motor which drives the drive magnet increases the load on that coupling. When the coupling is broken, the impeller may shift in the bowl and necessitate the operator manually hunting for the impeller in the beverage with his hands to reposition it. In accordance with the present invention a sump is provided in the bottom of the bowl in which the whipper housing is seated, and the bottom wall thickness of the sump is reduced to approximately 0.060 inch to reduce the gap between the magnets to approximately 0.250 inch so as to improve the coupling and hold the whipper in place.

The features and advantages of this invention will be better understood and appreciated from the following detailed description read in connection with the accompanying drawings.

BRIEF FIGURE DESCRIPTION

DETAILED DESCRIPTION

Figure 1:
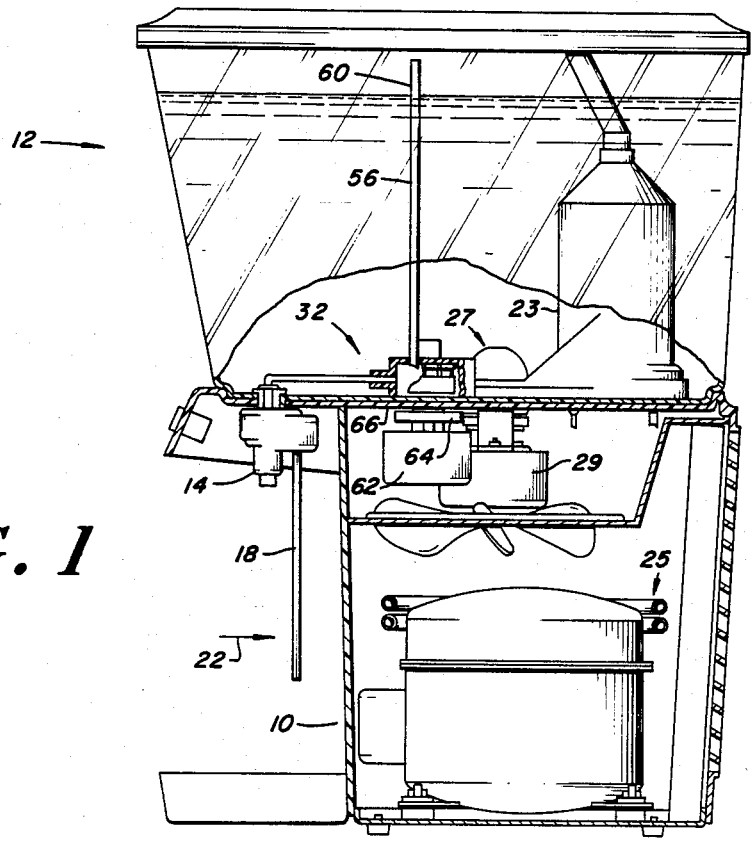
FIG. 1 is a side view, partly in section, showing a beverage dispenser constructed in accordance with the invention.

The beverage dispenser shown in the drawing includes a base 10 and bowl 12 which typically may be like the beverage dispenser shown in U.S. Pat. No. 3,822,565 entitled "Beverage Dispenser" and assigned to the assignee of this application. The bowl has a discharge spigot 14 through which the beverage in the bowl is dispensed to a cup or other container. The spigot is controlled by a pinch tube 16 made of flexible material such as rubber and push handle 18 pivotally supported beneath the bowl and having a finger 20 which pinches the tube to close it when the handle is released. When the handle is pushed rearwardly as suggested by arrow 22 in FIG. 1 of the drawing, the finger releases the tube and the beverage in the bowl may flow into the cup.

The beverage dispenser includes a refrigeration system having an evaporator 23 in the bowl in heat exchange relationship with the beverage to cool it. The other parts of the refrigeration system including a condenser, compressor and fan collectively identified by number 25, are mounted in base 10. In addition, a circulating system including a pump 27 may be disposed in the bowl and be driven by a motor 29 magnetically coupled to it, to circulate the beverage so as to maximize the heat exchange between the beverage and evaporator.

Figure 3:
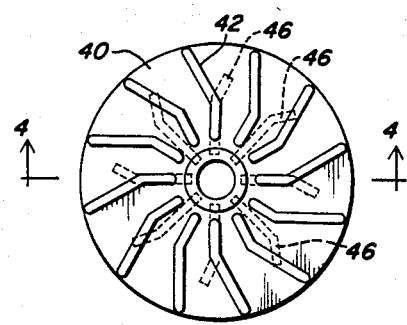
FIG. 3 is a top view of the impeller with the housing vanes suggested in broken lines.
Figure 4:
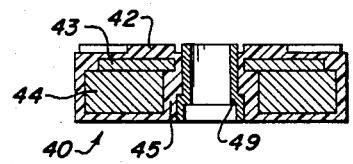
FIG. 4 is an enlarged cross-section of the impeller taken on section line 4—4 in FIG. 3.

The whipper assembly 32 rests on the bottom wall 30 of the bowl 12. The assembly has a generally cylindrical housing 34 open at bottom 36 which defines a whipping chamber 38 that houses an impeller 40. As shown in FIG. 4, the impeller includes blades 42, backup plate 43, driven magnet 44, frame 45 and bushing 49. A plurality of fins 46 are carried on the inside of the housing within chamber 38. The fins 46 extend downwardly toward the blades 42 and cooperate with them when the impeller rotates to whip up the beverage which enters the housing. It will be noted in FIG. 3 that the outer ends of blades 42 and fins 46 are turned toward one another with respect to the direction of rotation of the impeller and that blades 42 extend radially beyond the fins to enhance the whipping action.

Figure 2:
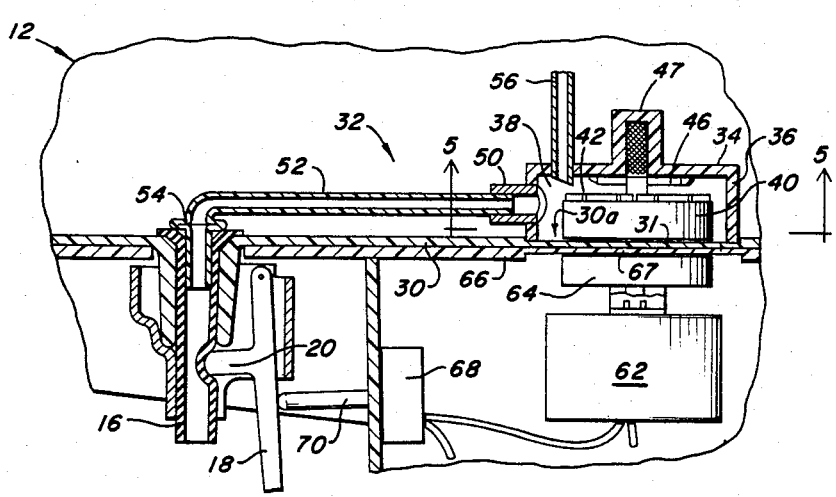
FIG. 2 is an enlarged, fragmentary, cross-sectional view of the whipper assembly and discharge spout of the dispenser in FIG. 1.

It will be noted in FIG. 2 that bottom wall 30 of the bowl is formed with a sump 30a whose bottom wall 31 is substantially thinner than the surrounding area. In the preferred embodiment, the regular wall thickness is 0.175 inch, while the thickness of wall 31 is 0.060 inch. The side wall 36 of the housing 34 rests on the wall 31 within the sump to position the housing 34 and prevent it from shifting in the bowl. The drip tray 66 which supports the bowl is also substantially thinned out at 67 as shown in the drawing. The total thickness of the walls 31 and 67 is approximately 0.120 inch so as to reduce the gap between the magnets as is discussed more fully below.

Figure 5:
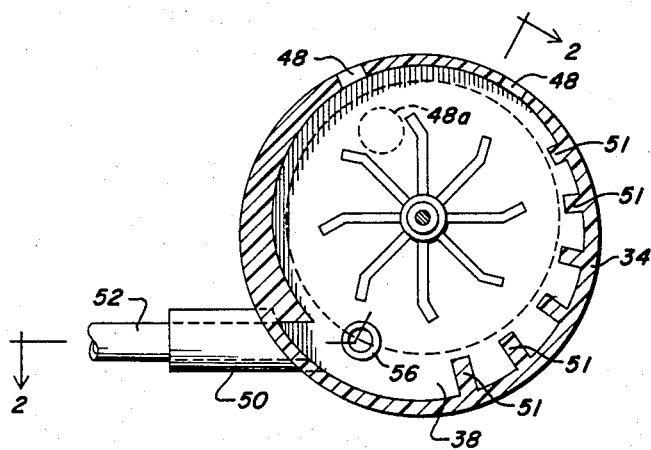
FIG. 5 is a cross-sectional view through the whipper assembly housing and suggesting alternative locations for the inlet to the housing.

The housing 34 has a pair of inlet ports 48 in its side wall (see FIG. 5) which are open to the beverage in bowl 12 so that the beverage may flow freely into the chamber 38. It has been determined that when lighter beverages are being whipped, the two ports in the side wall produce a better consistency in the beverage and promote a faster flow rate. On the other hand, if a heavier beverage such as a milk shake is being dispensed, a single large inlet port in the top wall of the housing as suggested by broken lines at 48a is preferred. Housing 34 also includes a discharge passage 50 in side wall 36 and distal from inlet ports 48 or 48A. The impeller 40 is eccentrically suspended in chamber 38 by shaft 47 that passes through bushing 49, and the impeller and housing form a volute that increases in size from inlet port 48 (or 48a) to outlet passage 50. A number of vertical ribs 51 attached to the housing 34 occupy the volute at its wider end, and the width of ribs 51 increase successively toward outlet passage 50. These ribs further increase the churning and whipping action in the chamber 38 as the impeller rotates.

In the embodiment shown a feeder tube 52 directly connects the discharge passage 50 with the upper end of pinch tube 16 so that the full discharge from the whipper assembly flows directly to spigot 14. In order to position the feeder tube 52 with respect to the pinch tube, feeder tube 52 is upset as suggested at 54. This serves not only to properly position the feeder tube with respect to the spigot but also serves to level the whipper housing in bowl 12.

An air inlet tube 56 is mounted on housing 34 and communicates with chamber 38 adjacent discharge passage 50. The upper end 60 of the air inlet tube is located above the liquid level in the bowl. The lower end of the tube within chamber 38 is inclined so as to face discharge passage 50 (see FIG. 2). This creates a low pressure region in chamber 38 to draw air into the chamber as the impeller rotates.

The whipper assembly 32 is driven by motor 62 located in base 10, which carries a drive magnet 64 magnetically coupled to whipper magnet 44 through bottom wall 31 of bowl 12 and wall 67 of the condensate tray 66 which supports the bowl. The motor is energized by a circuit which includes switch 68 having plunger 70 in the path of push handle 18 when the handle is moved rearwardly to open the pinch tube. Consequently, when the valve established by pinch tube 16 and handle 18 is open, motor 62 is energized, which in turn energizes the whipper assembly. And when the valve is closed by release of handle 18, the motor is deenergized to shut off the whipper assembly. The gap between the two magnets 44 and 64 is approximately 0.250 inch, which essentially assures that the magnets will remain coupled at all times during normal running speeds even with the heaviest beverages. And should uncoupling occur, the whipper will remain in place so that the machine may be restarted without having to fish for the whipper in the beverage.

When the whipper assembly is placed in operation by actuation of switch 68, the impeller rotates, and blades 42 in cooperation with fins 46 and 51 stir the beverage in chamber 38. Simultaneously, as the beverage flows into discharge passage 50, the low pressure region established below air inlet tube 56 causes air to be entrained through the tube to add a frothiness to the whipped drink. When the cup is filled, the operator merely releases the handle which in turn stops the motor and deactivates the whipper assembly. The motor of the circulating system is uneffected by this action.

It will be noted that there are no fittings or clamps which seal the whipper housing 34 against lower wall 30 of the bowl. Consequently, when the beverage in the bowl is stirred by the circulating pump 27, beverage will flow around and through the chamber 38 because of the lack of seals. The open bottom 36 provides substantial access to the interior of the bowl from the chamber 38, and therefore there is no stagnation of beverage in the whipper housing.

The magnetic drive for the whipper performs yet another function. It assists in holding the housing 34 in the bowl without the use of special clamps or other such devices. The driven magnet 44 which is suspended from the housing is pulled into registration with drive magnet 64. The mechanism is therefore self aligning, and the magnets by their mutual attraction assist in retaining the assembly in place. The upset 54 on the feeder tube 52 assures that the housing is level in the bowl.

In accordance with the present invention, the motor 62 which rotates the drive magnet 64 rotates at a rate of between 4000 and 8000 rpm, which is substantially greater than the speed at which the in-bowl whipper was previously rotated. This is accomplished by using a series-type brush motor rated of approximately 1/10 horsepower. By increasing the speed to the range of 4000 rpm or more, a smoother whipping of the beverage is produced of fine and more uniform bubbles which in turn are better retained in the drink. Also in accordance with this invention, the height of the blades 42 of the whipper 40 is reduced to the range of 1/32 to 1/16 inch. This greatly reduced blade height contributes to the finer and more uniform bubbles in the whipper beverage and with the reduced thickness of walls 31 and 67 prevent the two magnets from uncoupling during operation of the whipper.

Having described this invention in detail, those skilled in the art will appreciate that numerous modifications may be made of the embodiments illustrated and described without departing from the spirit of this invention. Therefore, it is intended that the scope of this invention be determined by the appended claims and their equivalents.

We claim:

1. In a beverage dispensing machine having a base and a bowl mounted above the base, a whipper assembly for frothing non-carbonated beverages dispensed by the machine comprising a housing adapted to be immersed in the beverage in the bowl, said housing having a top wall and a generally cylindrical side wall, an outlet passage from the housing in the side wall, and a pair of inlet ports in the side wall distal from said outlet passage, an impeller body in the housing having a driven magnet imbedded therein, impeller blades formed on the top surface of the body, said blades not exceeding 1/16 inch in height, fins mounted on the housing and extending downwardly toward the blades, a drive magnet mounted in the base and magnetically coupled to the driven magnet in the impeller, and a motor in the base connected to the drive magnet for rotating the impeller at 4000 to 8000 rpm.

2. In the whipper assembly as defined in claim 1, said motor being a series brush-type motor.

3. A beverage dispenser as described in claim 1 further characterized by a sump in the bottom wall of the bowl and the housing being mounted in the sump, said magnets being coupled through the bottom wall of the sump, the gap between the magnets being approximately 0.250 inch.

4. A beverage dispenser comprising a base and a bowl mounted on the base for containing the beverage to be discharged by the dispenser, a spigot connected to the bowl through which the bowl contents may be discharged, a valve operatively associated with the spigot for opening and closing it to control the flow of beverage from the bowl, a whipper assembly within the bowl and intended to be immersed in the beverage in the bowl, said assembly including a housing having a top wall and a generally cylindrical side wall, a pair of inlet ports in the side wall for enabling beverage in the bowl to enter the housing, an impeller in the housing, said impeller having blades on its upper surface not exceeding 1/16 inch in height, fins formed in the housing and cooperating with the blades on the impeller for whipping beverage in the housing when the impeller rotates, and an outlet passage in the housing side wall distal from said inlet ports and connected to the spigot for discharging beverage whipped, in the housing, means including a motor in the base operatively connected to the impeller for rotating the impeller to activate the whipper assembly, means operatively connecting the valve and the motor causing the motor to activate the whipper when the valve is open and deenergize the whipper when the valve is closed, and an air inlet tube connected to the housing and adapted to extend above the beverage in the bowl and communicating with the interior of the housing adjacent the outlet passage for introducing air into the housing to be used in whipping the beverage in the whipper assembly, and said dispenser being characterized by said motor rotating the impeller at above 4000 rpm.

5. A beverage dispenser as described in claim 4 further characterized by said spigot including a pinch tube and a push handle connected to the valve cooperating therewith to open and close the spigot, and a feeder tube joining the housing outlet and pinch tube to carry whipped beverage from the housing to the spigot.

* * * * *